United States Patent [19]

Bittle et al.

[11] 4,059,668
[45] Nov. 22, 1977

[54] METHOD OF STRETCHING A TOW

[75] Inventors: David F. Bittle, Decatur, Ala.; Arnold L. McPeters, Raleigh, N.C.

[73] Assignee: Monsanto Company, Decatur, Ala.

[21] Appl. No.: 574,062

[22] Filed: May 2, 1975

Related U.S. Application Data

[63] Continuation-in-part of Ser. No. 415,485, Nov. 13, 1973, abandoned, which is a continuation-in-part of Ser. No. 244,195, April 14, 1972, abandoned, which is a continuation-in-part of Ser. No. 50,485, June 29, 1970, abandoned.

[51] Int. Cl.² .............................................. B29C 17/02
[52] U.S. Cl. ................................. 264/290 R; 28/240; 264/290 N; 264/290 T
[58] Field of Search ........... 264/290 N, 290 R, 290 T, 264/210 F, 291, DIG. 73; 28/59.5, 71.3, 76 R

[56] References Cited

U.S. PATENT DOCUMENTS

| 2,450,045 | 9/1948 | Jackson et al. | 28/59.5 |
|---|---|---|---|
| 2,509,279 | 5/1950 | Sisson | 264/DIG. 28 |
| 2,661,618 | 12/1953 | Bessom | 264/DIG. 28 |
| 2,918,346 | 12/1959 | Paulsen | 8/130.1 |
| 3,330,898 | 7/1967 | Hurley et al. | 264/290 R |

FOREIGN PATENT DOCUMENTS 758,398  10/1956  United Kingdom ............. 264/290 T Primary Examiner—James B. Lowe
Attorney, Agent, or Firm—Robert L. Broad, Jr.

[57] ABSTRACT

A method for stretching a tow of filaments wherein the tow is passed under tension through a chamber, the chamber having openings at the ends thereof for passage of the tow, and streams of heated liquid are forced transversely through the tow at the chamber openings at a critical minimum rate at least as great as $$x = 3,000T\sqrt{(WN/h)(\mu/\rho)}$$

where $x$ is the heated liquid flow rate in gallons per minute through each opening, $T$ is the thickness of the streams of heated liquid in inches at said openings, $W$ is the width of the openings and the liquid streams in inches, $h$ is the height or thickness in inches that the tow is free to assume in passing through the openings, $N$ is the number of filaments in the tow, $\mu$ is the viscosity of the heated liquid in pounds per foot-second and $\rho$ is the density of the heated liquid in pounds per cubic foot.

10 Claims, 3 Drawing Figures

METHOD OF STRETCHING A TOW

This is a continuation-in-art of application Ser. No. 415,485, filed Nov. 13, 1973 for "Method Of Stretching A Tow", now abandoned, which was a continuation-in-part of application Ser. No. 244,195 filed Apr. 14, 1972 for "Method Of Stretching A Tow", now abandoned, which was a continuation-in-part of application Ser. No. 50,485 filed June 29, 1970 for "Method Of Stretching A Tow", now abandoned, in the names of David F. Bittle and Arnold L. McPeters.

BACKGROUND OF THE INVENTION a. Field of the Invention

This invention relates to methods for stretching tows of filaments.

b. Description of the Prior Art

A number of man-made filaments of various known types are made by forcing a spinning solution through a spinnerette to form a tow of filaments. In almost all of the various types of man-made filaments it is necessary at one point or another to stretch the filaments to obtain desired properties. In order to obtain best results the tow is usually heated in some manner and is stretched while hot. The heating of the tow is usually accomplished by passing the tow over heated rolls or through a steam chamber or by other known methods such as the use of sprays or cascades.

Apparatus other than cascades and sprays may be used for stretching a tow. U.S. Pat. No. 3,267,704 issued to H. G. Mueller and U.S. Pat. No. 3,353,383 issued to E. A. Taylor, Jr., for example, show apparatus for washing a tow wherein the washing liquid is continually passed back and forth through the tow. Such apparatus can be used for stretching a tow if the apparatus is sufficient in length and the liquid is sufficiently hot. In fact, a simple bath can be used if it is long enough. The requirement which must be met is that the tow must be wet and at a sufficiently high temperature.

The disadvantage of most of the known methods of heating and stretching tow is that the heating operation is inefficient and slow, especially when sprays or baths are used. Either the tow must have a long dwell time in the heating zone or excessive temperatures must be used to raise the temperature of the filaments to a point where they can be stretched. Further, it is very difficult in conventional stretching processes to heat the inner filaments of the tow to the same temperature as the outer filaments, since the outer layers of filaments shield the inner filaments from the heated liquid.

SUMMARY OF THE INVENTION

In the method of this invention tow is stretched by passing it under tension through a chamber having openings at the ends thereof for passage of the tow into and out of the chamber and forcing a heated liquid transversely through the tow at the chamber openings at a rate in excess of a predetermined critical value, the liquid being maintained at a temperature within a predetermined range. The rate at which the heated liquid is passed through the tow in the chamber openings must be at least as great as $$x = 3{,}000T\sqrt{(WN/h)}\,(\mu/\rho)$$

where $x$ is the heated liquid flow rate in gallons per minute through each chamber opening, $T$ is the thickness in inches of the streams of heated liquid flowing through the openings, $W$ is the width in inches of the openings and the liquid streams, $h$ is the thickness in inches that the tow is free to assume in passing through the openings, $N$ is the number of filaments in the tow, $\mu$ is the viscosity of the heated liquid in pounds per foot-second and $\rho$ is the density of the heated liquid in pounds per cubic foot.

DETAILED DESCRIPTION OF THE INVENTION

Figure 2:
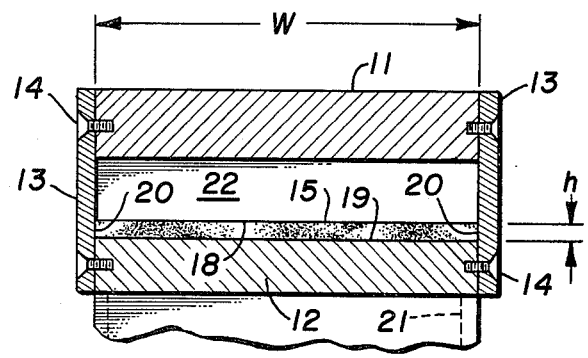
FIG. 2 is a cross-sectional view taken along line 2—2 of FIG. 1 showing the cross-sectional area of the openings through which the tow is passed.

Referring now in detail to the drawing there is shown, in a more or less diagrammatic manner, a tow heater 10 which is useful in carrying out the method of the present invention. The apparatus 10 is made up of upper and lower units 11 and 12 which are held in a spaced relationship by side plates 13, the side plates 13 being secured to the upper and lower units 11 and 12 by screws 14. The upper unit is recessed and with the lower unit 12 forms a chamber 22 through which a tow 15 passes. The lower face 18 of the upper unit 11 and the upper face 19 of the lower unit 12 and the inner faces of the side plates 13 define openings 23 at the ends of the chamber through which the tow 15 passes, the tow entering the chamber through one opening and exiting through the other. The cross-sectional areas of the openings at the ends of the chamber is best shown in FIG. 2 where "h" is the height or thickness of the opening and "W" is the width of the opening, the opening thus having a cross-sectional area of W$h$, as best shown in FIG. 2. The area W$h$ is the area that the cross section of the tow is free to assume in passing through the openings at the ends of the chamber.

The lower unit 12 is provided with an inlet 21, near the midpoint of the chamber, through which a heated liquid is admitted to the chamber. The inlet 21 extends across the lower unit 12 from one of the side plates 13 to the other, so that it has a width W.

Figure 1:
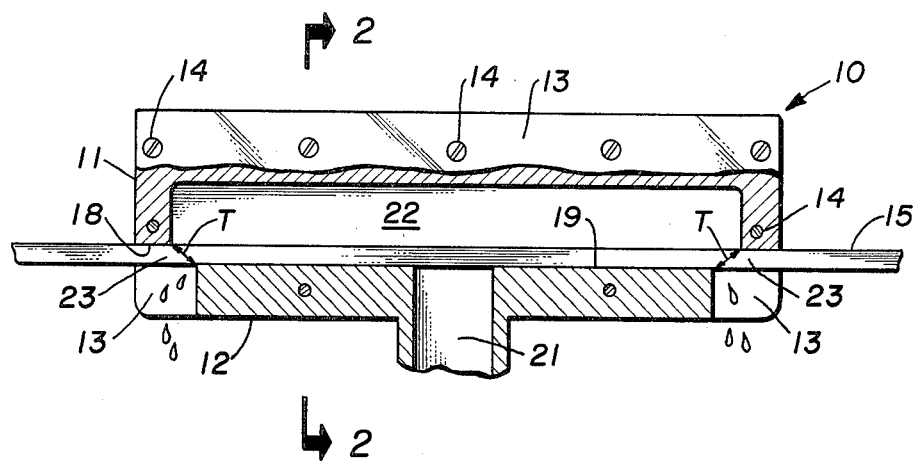
FIG. 1 is a diagrammatic cross-sectional view of an apparatus or tow heater useful for carrying out the process of the present invention.

The chamber 22 directs the heated liquid back through the tow at the openings 23 is streams having a thickness T (FIG. 1). The value for the dimension T should be within the range of 2$h$ to 5$h$. The heated liquid entering the inlet 21 passes through the tow 15 and is divided into substantially equal portions which pass back through the tow 15 at the openings 23. The chamber 22 completely fills with liquid under pressure. This pressure forces the liquid through the openings 23, and the tow 15, at a high velocity.

Figure 3:
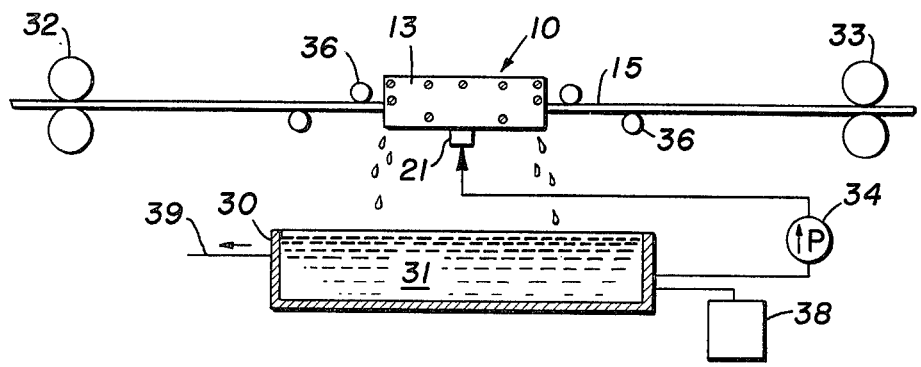
FIG. 3 is a diagrammatic view of apparatus used with the tow heater in carrying out the process of the present invention.

As shown in FIG. 3, the tow heater 10 is mounted over a vat 30 containing a heated liquid 31, such as water. Spaced pairs of driven rolls 32 and 33 feed the tow 15 through the tow heater 10 at a uniform speed, with the rolls 33 being driven at a higher peripheral speed than the rolls 32 to thereby stretch or draw the tow. By adjusting the speed of the rolls 33 relative to the speed of the rolls 32, and thereby adjusting the tension applied to the tow in the chamber, the draw ratio can be adjusted. The speed of the rolls 32 and 33 will determine the dwell or residence time of the tow in the chamber, i.e., the time that it takes a point on the tow to pass through the chamber. Since it is not known at what point the tow stretches in the chamber, approximation of the dwell time can be determined by assuming that the tow stretches at the midpoint of the chamber and then computing the dwell time. The following equation can be used, Dwell time = $(L/2Vi) + (L/2Vo)$ where $L$ is the length of the chamber in inches, $Vi$ is the speed of the tow, in inches per second, entering the apparatus and $Vo$ is the speed of the tow, in inches per second, leaving the apparatus.

A pump 34 connected to the vat or reservoir 30 and the inlet 21 of the heater 10 pumps the liquid from the vat 30 through the heater via the inlet 21. The liquid exiting from the heater 10 falls back into the vat 30 and is recirculated. Additional liquid may be added to the vat or reservoir 30 from a supply 38 to maintain a uniform level. An overflow line 39 drains off excess water from the reservoir 30. Pairs of stripper bars 36 positioned in contact with the tow as shown in FIG. 3 are used to prevent liquid from overflowing beyond the edges of the vat 30.

The denier of the filaments in the tow is not a factor in this process. Larger filaments require more heat for stretching than do smaller filaments. However, with a constant flow rate into the chamber the actual flow rate between filaments at the openings will be higher with large filaments than with small filaments. The reason for this is that larger filaments occupy more space in the openings 23, leaving less space for passage of the liquid and thereby increasing the velocity of the liquid through the tow.

Of course, a portion of the heated liquid will, in an apparatus such as described above, not pass completely through the tow but will travel along the voids in the tow to the openings 23. Since it would be very difficult to actually measure the liquid flow rate inside the tow, an easier way of determining whether the minimum critical flow rate is exceeded is desired. If the openings 23 are held within the limits set out above one half the flow rate into the inlet 21 can be compared with the minimum critical flow rate of $3,000T \sqrt{WN/h} \, (\mu/\rho)$ to determine whether minimum critical flow rate is exceeded, without regard for actual flow rate in the tow or the fact that some of the liquid will travel along voids in the tow.

The table below shows values of $\mu$ and $\rho$ for water at various temperatures.

| Temperature °C. | lbs/ft-sec | lbs/cu.ft. |
|---|---|---|
| 30 | 5.38 × 10⁻⁴ | 62.16 |
| 35 | 4.85 × 10⁻⁴ | 62.06 |
| 40 | 4.40 × 10⁻⁴ | 61.95 |
| 45 | 4.02 × 10⁻⁴ | 61.82 |
| 50 | 3.69 × 10⁻⁴ | 61.68 |
| 55 | 3.40 × 10⁻⁴ | 61.54 |
| 60 | 3.15 × 10⁻⁴ | 61.38 |
| 65 | 2.92 × 10⁻⁴ | 61.22 |
| 70 | 2.72 × 10⁻⁴ | 61.04 |
| 75 | 2.55 × 10⁻⁴ | 60.86 |
| 80 | 2.39 × 10⁻⁴ | 60.67 |
| 85 | 2.25 × 10⁻⁴ | 60.47 |
| 90 | 2.12 × 10⁻⁴ | 60.27 |
| 95 | 2.01 × 10⁻⁴ | 60.05 |
| 100 | 1.90 × 10⁻⁴ | 59.83 |

EXAMPLE I

A copolymer of 93% acrylonitrile and 7% vinyl acetate was spun into a spin bath made up of 55% dimethylacetamide and 45% water. The tow formed was made up of 40,000 filaments, 15 denier per filament. The tow was withdrawn from the spin bath, washed to remove dimethylacetamide and then passed through a tow heating apparatus such as that described above. The apparatus had a chamber 5.2 inches long and the dimensions: $T = 9/16''$; $h = 3/16''$ and $W = 3\frac{7}{8}''$. Water at a temperature of 100° C was circulated through the apparatus at a rate of 30 gallons per minute. The tow was fed into the stretch zone at 26.5 feet per minute and withdrawn at 132.5 feet per minute, giving a stretch or draw ratio of 5 to 1. The dwell or residence time was approximately 0.6 seconds. No broken filaments were observed.

EXAMPLE II

Example I was repeated using water temperatures of 50° C, 60° C, 70° C, 80° C, 90° C, 100° C, 102° C, 104° C, 106° C and 108° C in order to determine the temperature range in which the stretching of this acrylic tow could be accomplished. The temperatures above 100° C were accomplished by constructing the apparatus in such a manner that the heated water made 20 passes back and forth through the tow in order to obtain a sufficient back pressure to raise the temperature of the water above 100° C. It was found that, in order to obtain a 4X stretch the temperature of the water had to be at least 80° C. Preferably, the water temperature is maintained at a value above 90° C.

EXAMPLE III

Modacrylic fibers were spun from a spin dope comprised of 65.9% acrylonitrile, 19% vinylidene chloride, 10% vinyl bromide, 1.9% sodium sulfonate, 1.2% styrene and 2% antimony trioxide dissolved in dimethylacetamide to give a solution containing about 20% solids. A tow bundle of 18,000 filaments was spun into a spin bath made up of 55% dimethylacetamide and 45% water. The tow was withdrawn from the spin bath and washed to remove dimethylacetamide and was then passed through a tow stretching apparatus such as that described above. The apparatus had a chamber 5.2 inches long and the dimensions: $T = 9/16''$; $h = 7/32''$ and $W = 3\frac{1}{2}''$. Water at a temperature of 100° C was circulated through the apparatus at the rate of 30 gallons per minute. The dwell time of the tow in the chamber was 1.4 seconds. The speeds of the rolls 32 and 33 were adjusted to give the tow a stretch of 3.4×. No broken filaments were observed.

EXAMPLE IV

A tow bundle of acrylic filaments of a copolymer of 93% acrylonitrile and 7% vinyl acetate was spun and washed as described in the above examples, the tow bundle containing 160,000 filaments. The filaments denier entering the stretching apparatus was 16.5 dpf. The apparatus had a chamber $7\frac{7}{8}''$ long and the following dimensions: $T = 0.63''$; $h = 0.34''$ and $W = 6''$. Water at a temperature of 95° C was forced through the tow at the openings 23 at a rate of 50 gallons per minute. The preferred minimum flow rate in accordance with the invention was 10.5 gallons per minute. The tow was stretched 4.2× and was in the chamber for a dwell time of 0.9 seconds. No breaks in the filaments were observed.

EXAMPLE V

A number of runs were made using filaments of different chemical composition wherein the filaments were stretched in accordance with the process of the present invention. Fiber types included in these runs were polyvinyl chloride, polyester, nylon 66 and rayon, all well known to those skilled in the art. The treatment liquid was 98% water and 2% of a conventional finish, at a temperature of 100° C.

The chamber had the following dimensions: $W = 3/16''$; $h = 3/16''$; and $T = 9/16''$, with an overall chamber length of 8 inches. The flow rate through the openings was 1.2 gallons per minute. The following table shows the conditions under which these runs were made and the amount of stretch applied to the various filaments.

| Fiber | Polyvinyl Chloride | | | | | | | Nylon | | Rayon | | | Polyester | |
| --- | --- | --- | --- | --- | --- | --- | --- | --- | --- | --- | --- | --- | --- | --- |
| Run No. | 1 | 2 | 3 | 4 | 5 | 6 | 7 | 8 | 9 | 10 | 11 | 12 | 13 | 14 |
| No. of Filaments | | | 100 | | | | | 140 | | 3,000 | | | 192 | |
| Tow speed entering chamber (Ft/min) | 39.5 | 20.0 | 59.0 | 10 | 40 | 50 | 60 | 10 | 40 | 20 | 40 | 10 | 40 | 40 |
| Tow speed leaving chamber (Ft/min) | 156 | 78.0 | 235 | 56.8 | 180 | 205 | 240 | 45 | 180 | 25 | 45 | 52 | 162.5 | 202.5 |
| Time in chamber (seconds) | 0.6 | 1.3 | 0.4 | 2.4 | 0.6 | 0.5 | 0.4 | 2.4 | 0.6 | 1.8 | 0.9 | 2.4 | 0.6 | 0.6 |
| Stretch Ratio | 4 | 4 | 4 | 5.6 | 4.5 | 4.0 | 4.0 | 4.5 | 3.5 | 1.25 | 1.1 | 5.2 | 4 | 5 |

From the foregoing examples it can be seen that the dwell time of the tow in the treatment zone varies from less than one-half second to several seconds. A practical lower limit on the dwell time would probably be about 0.1 to 0.25 seconds, preferably 0.25 seconds. The dwell times shown in the examples are not the minimum but are those which actually resulted from the entrance and exit speeds of the tow from the treatment zone in the runs made.

It will be noted from the drawing that the chamber has an opening 23 at each end and that the dimensions W, h and T are dimensions of the openings. The dimensions W and h define an area W$h$ which is a cross-sectional area that the filaments are free to assume in passing through the openings. The dimensions W and T define an area WT which the cross section of the liquid stream is free to assume in passing through the openings 23. In other words, at the critical point of the operation the tow has a cross-sectional area W$h$, and the liquid stream has a cross-sectional area WT.

It is not necessary that the heating fluid be water. For example, the heated fluid may be ethylene glycol, polyethylene glycol or other high boiling alcohols. The advantage of using one of these liquids is that temperatures higher than 100° C can easily be utilized.

What is claimed is:

1. The method of stretching a tow of filaments selected from the group consisting of acrylic, modacrylic, nylon, polyester, rayon and polyvinyl chloride comprising:

a. advancing the tow into a chamber at a first speed, said chamber having an opening at each end thereof for the passage of tow into and out of the chamber and for the passage of a heated liquid out of the chamber.

b. forcing a stream of heated liquid into the chamber at a point between the openings in the chamber to fill the chamber with heated liquid and force said liquid through the tow from one side thereof to the other and, then transversely back through the tow and out of the chamber at said openings, said liquid being forced into the chamber at such a rate that the heated liquid flow rate outward through each of the openings is at least $$x = 3,000T \sqrt{(WN/h)} (\mu/\rho)$$

where $x$ is the flow rate through each openings in gallons per minute, $T$ is the thickness in inches of the stream of heated liquid flowing through each opening, $W$ is the width in inches of each liquid stream and the tow passing through the openings, $h$ is the thickness in inches of the tow passing through said openings, $N$ is the number of filaments in the tow, $\mu$ is the viscosity of the heated liquid in pounds per foot-second and $\rho$ is the density of the heated liquid in pounds per cubic foot, the dimensions W and h defining an area that the cross section of the tow is free to assume at the openings, the dimensions W and T defining an area WT which is the cross sectional area that the stream of liquid is free to assume at said openings, and c. withdrawing the tow from the chamber at a second speed greater than the first so that the filaments are stretched.

2. The method of claim 1 wherein the filaments are acrylic.

3. The method of claim 1 wherein the filaments are modacrylic.

4. The method of claim 1 wherein the filaments are rayon.

5. The method of claim 1 wherein the filaments are nylon.

6. The method of claim 1 wherein the filaments are polyester.

7. The method of claim 1 wherein the filaments are polyvinyl chloride.

8. The method of claim 1 wherein the residence time of the tow in the chamber is at least 0.1 seconds.

9. The method of claim 1 wherein the residence time of the tow in the chamber is at least 0.25 seconds.

10. The method of claim 9 wherein the liquid is water heated to at least 80° C.

* * * * *